United States Patent
Kwak et al.

(10) Patent No.: US 7,689,753 B2
(45) Date of Patent: Mar. 30, 2010

(54) METHOD OF OPERATING WIRELESS USB APPARATUS BY RECEIVING OPERATION STATE INFORMATION AND WIRELESS USB APPARATUS USING THE SAME

(75) Inventors: Dong Won Kwak, Seoul (KR); Yong Suk Kim, Daejeon (KR); Chang Mo Chung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 11/598,747

(22) Filed: Nov. 14, 2006

(65) Prior Publication Data

US 2007/0260801 A1 Nov. 8, 2007

(30) Foreign Application Priority Data

May 2, 2006 (KR) ...................... 10-2006-0039636

(51) Int. Cl.
*G06F 13/14* (2006.01)
(52) U.S. Cl. .................. 710/305; 710/105; 710/106
(58) Field of Classification Search ......... 710/300–315, 710/62–64, 72–73, 8–15, 105–106; 455/11.1, 455/452.2; 370/203, 350, 254, 338
See application file for complete search history.

(56) References Cited

U.S. PATENT DOCUMENTS

| | | | | |
|---|---|---|---|---|
| 6,603,744 | B2 * | 8/2003 | Mizutani et al. | 370/310 |
| 6,898,652 | B2 * | 5/2005 | Peters et al. | 710/300 |
| 7,149,839 | B2 * | 12/2006 | Aull et al. | 710/310 |
| 7,254,399 | B2 * | 8/2007 | Salokannel et al. | 455/452.2 |
| 7,424,568 | B2 * | 9/2008 | Bae et al. | 710/313 |
| 7,454,218 | B2 * | 11/2008 | Mo et al. | 455/502 |
| 2004/0246909 | A1 * | 12/2004 | Ahn | 370/252 |
| 2005/0036475 | A1 * | 2/2005 | Nishiyama et al. | 370/347 |
| 2006/0083234 | A1 | 4/2006 | Sung et al. | |
| 2006/0149858 | A1 * | 7/2006 | Bhesania et al. | 710/5 |

(Continued)

FOREIGN PATENT DOCUMENTS

WO   2005088915 A1   9/2005

OTHER PUBLICATIONS

Kolic, R., "Wireless USB Brings Greater Convenience and Mobility to Devices," Tech. Intell Magazine, Feb./Mar. 2004, pp. 1-7.

(Continued)

*Primary Examiner*—Raymond N Phan
(74) *Attorney, Agent, or Firm*—Sughrue Mion, PLLC (57) ABSTRACT

A method of operating a wireless universal serial bus (USB) apparatus and the wireless USB apparatus using the same. The method including: receiving operation state information from a neighboring wireless USB apparatus in a beacon period (BP); the wireless USB apparatus, which is operating as a host in a first cluster by using the operation state information, identifying a distributed reservation protocol (DRP) corresponding to a second cluster; and the wireless USB apparatus, which is operating as the host in the first cluster, participating in the second cluster as a device by transmitting and receiving data in the DRP corresponding to the second cluster. Accordingly, the wireless USB apparatus which operates as a host may participate in a neighboring WUSB cluster as a device.

13 Claims, 8 Drawing Sheets

U.S. PATENT DOCUMENTS

2006/0198335 A1* 9/2006 Reunamaki et al. ......... 370/328
2007/0073842 A1* 3/2007 Uehara ....................... 709/218
2007/0073935 A1* 3/2007 Kim et al. ..................... 710/62
2007/0294456 A1* 12/2007 Chan et al. ................. 710/313

OTHER PUBLICATIONS

Intel, "Wireless USB The First High-speed Personal Wireless Interconnect," IN: the Intel Developer Forum, Feb. 17, 2004, pp. 1-8.

* cited by examiner

| MODE FIELD | INDICATION |
|---|---|
| 0 | WUSB HOST |
| 1 | WUSB DEVICE |
| 2 | WUSB DUAL ROLE |

METHOD OF OPERATING WIRELESS USB APPARATUS BY RECEIVING OPERATION STATE INFORMATION AND WIRELESS USB APPARATUS USING THE SAME

CROSS-REFERENCE TO RELATED APPLICATION

This application claims the benefit of Korean Patent Application No. 10-2006-0039636, filed on May 2, 2006, in the Korean Intellectual Property Office, the disclosure of which is incorporated herein by reference.

BACKGROUND OF THE INVENTION

1. Field of the Invention

The present invention relates to a multiband orthogonal frequency division multiplexing alliance (MBOA) medium access control (MAC) based wireless communication, and more particularly, a wireless universal serial bus (WUSB).

2. Description of Related Art

A universal serial bus (USB) is one of the most successful connecting methods in personal computer (PC) history, and numerous USB devices are currently used. As the USB has been continuously developed, the USB is widely used with PCs, PC peripherals, consumer devices, and mobile communication devices. Standardization and details of the USB are supported by a universal serial bus implementers forum (USB-IF).

Wireless universal serial bus (WUSB) is a technology combining USB technology with future wireless technology based on the success of the wired USB. The WUSB is applicable to the PC, the PC peripheral, the consumer device, and the mobile communication device like the wired USB. In order to maintain an identical usage model and a configuration of wired USB 2.0, the WUSB standard defines a high-speed host device. Accordingly, the WUSB standard may incorporate aspects from current wired USB solutions.

In order to support the development of the best solutions for a market emergence of ultra wideband (UWB) based technology, a multiband orthogonal frequency division multiplexing alliance (MBOA) was founded in June 2003, and comprised of over 170 member companies. The member companies originally suggested a UWB standard based on orthogonal frequency division multiplexing (OFDM) technology as Texas Instruments (TI) had proposed in March 2003. The UWB standard supports the most widely applied fields, and facilitates a regulatory approval process.

A WiMedia Alliance and a multiband orthogonal frequency division multiplexing alliance special interest group (MBOA-SIG) were combined into an organization in March 2005. The organization was named WiMedia Alliance, Inc. and continues to promote adoption and standardization of the UWB for high-speed wireless communication and multimedia-capable personal-area connectivity.

The WiMedia Alliance completed the standardization of a multiband orthogonal frequency division multiplexing alliance medium access control (MBOA MAC) and released the standardized MBOA MAC to MBOA-SIG members. Accordingly, many applications such as the WUSB, wireless. 1394, and wireless IP are operated based on the MBOA MAC.

Figure 1:
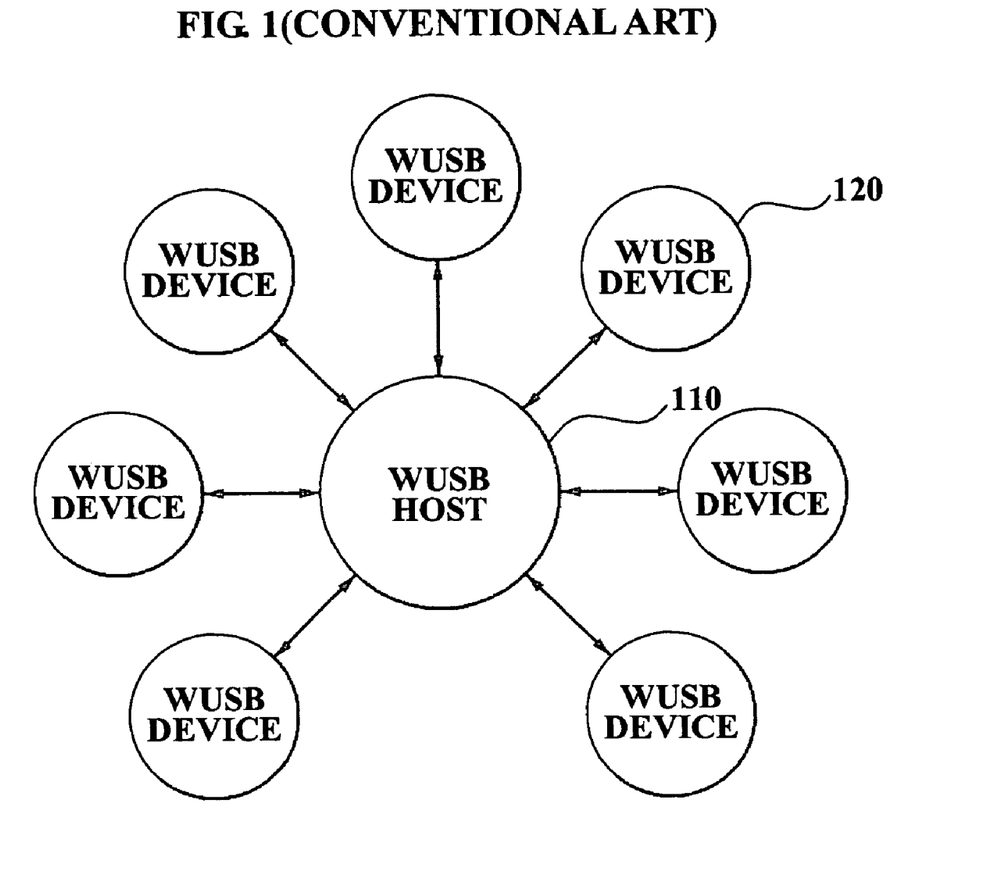
FIG. 1 is a diagram illustrating a wireless universal serial bus (WUSB) network according to a conventional art.

FIG. 1 is a diagram illustrating a WUSB network according to the conventional art.

Referring to FIG. 1, the WUSB network according to the conventional art includes a WUSB host 110, and a WUSB client 120.

A relationship between the WUSB host 110 and the WUSB client 120 is a star topology where each device directly connected. As illustrated in FIG. 1, one WUSB host and a plurality of WUSB devices indicates a cluster.

The WUSB host 110 may logically connect up to 127 devices, transmit data to and receive data from devices in the cluster, and perform scheduling. Also, the WUSB host 110 assigns a time slot and a band to each of the connected devices. The clusters may be piled up with minimum interference in a spatial environment. Accordingly, many WUSB clusters may exist together in a same wireless cell.

Various wireless WUSB apparatuses comprising a home network, etc. may form at least two WUSB clusters. For example, there is a WUSB cluster in which a digital television (DTV) operates as a host, and a WUSB cluster in which a portable multimedia player (PMP) operates as a host around the DTV. In this case, a WUSB apparatus which operates as a host in one cluster might not operate as a host in another cluster in the conventional art. Namely, the PMP which operates as a host in one cluster might not be connected to the DTV as a WUSB device while operating as the host, in the conventional art.

Accordingly, while operating as a host in one cluster, a new WUSB apparatus enabling a connection to a host in another neighboring cluster and operating as a device is highly required.

BRIEF SUMMARY OF EXEMPLARY EMBODIMENTS OF THE INVENTION

Exemplary embodiments of the present invention provide a wireless universal serial bus (WUSB) apparatus which operates as a host, which may effectively join another neighboring WUSB cluster as a device.

Exemplary embodiments of the present invention also provide a WUSB apparatus which operates as a host, which may effectively obtain information of WUSB apparatuses which belong to a neighboring WUSB cluster.

Exemplary embodiments of the present invention also provide a predetermined WUSB apparatus, which may obtain information about which WUSB apparatus from a plurality of WUSB apparatuses belonging to a neighboring WUSB cluster operates as a host, and which wireless USB apparatus from a plurality of WUSB apparatuses belonging to the neighboring WUSB cluster operates as a device.

Exemplary embodiments of the present invention also provide a WUSB apparatus, which enable a multi-hop data transmission by operating as a device in another WUSB cluster.

According to an aspect of the present invention, there is provided a method of operating a wireless universal serial bus (USB) apparatus, the method including: receiving operation state information from a neighboring wireless USB apparatus in a beacon period (BP); the wireless USB apparatus, which is operating as a host in a first cluster by using the operation state information, identifying a distributed reservation protocol (DRP) corresponding to a second cluster; and the wireless USB apparatus, which is operating as the host in the first cluster, participating in the second cluster as a device by transmitting and receiving data in the DRP corresponding to the second cluster.

In this instance, the identifying of the DRP includes: recognizing the wireless USB apparatus, which operates as the host in the second cluster, by using the operation state information; and identifying the DRP corresponding to the wireless USB apparatus which operates as the host in the second cluster.

In this instance, the operation state information of the wireless USB apparatus may be received using predetermined bits of a DRP control field of a distributed reservation protocol information element (DRP IE).

According to another aspect of the present invention, there is provided a wireless universal serial bus (USB) apparatus including: an operation state information receiving unit receiving operation state information from a neighboring wireless USB apparatus in a BP; a DRP identifier identifying the DRP corresponding to another cluster by using the operation state information while operating as a wireless USB host; and a data transceiving unit transmitting and receiving data in the DRP corresponding to the other cluster in order to participate in the other cluster as a device.

In this instance, the DRP identifier may recognize the wireless USB apparatus which operates as a host in the other cluster by using the operation state information, and identify the DRP corresponding to the wireless USB apparatus which operates as a host in the other cluster.

In this instance, the operation state information of the wireless USB apparatus may be received using predetermined bits of a DRP control field of the DRP IE.

In this specification, the wireless USB apparatus indicates a WUSB host, and a WUSB client.

BRIEF DESCRIPTION OF THE DRAWINGS

The above and/or other aspects and advantages of exemplary embodiments of the present invention will become apparent and more readily appreciated from the following detailed description, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
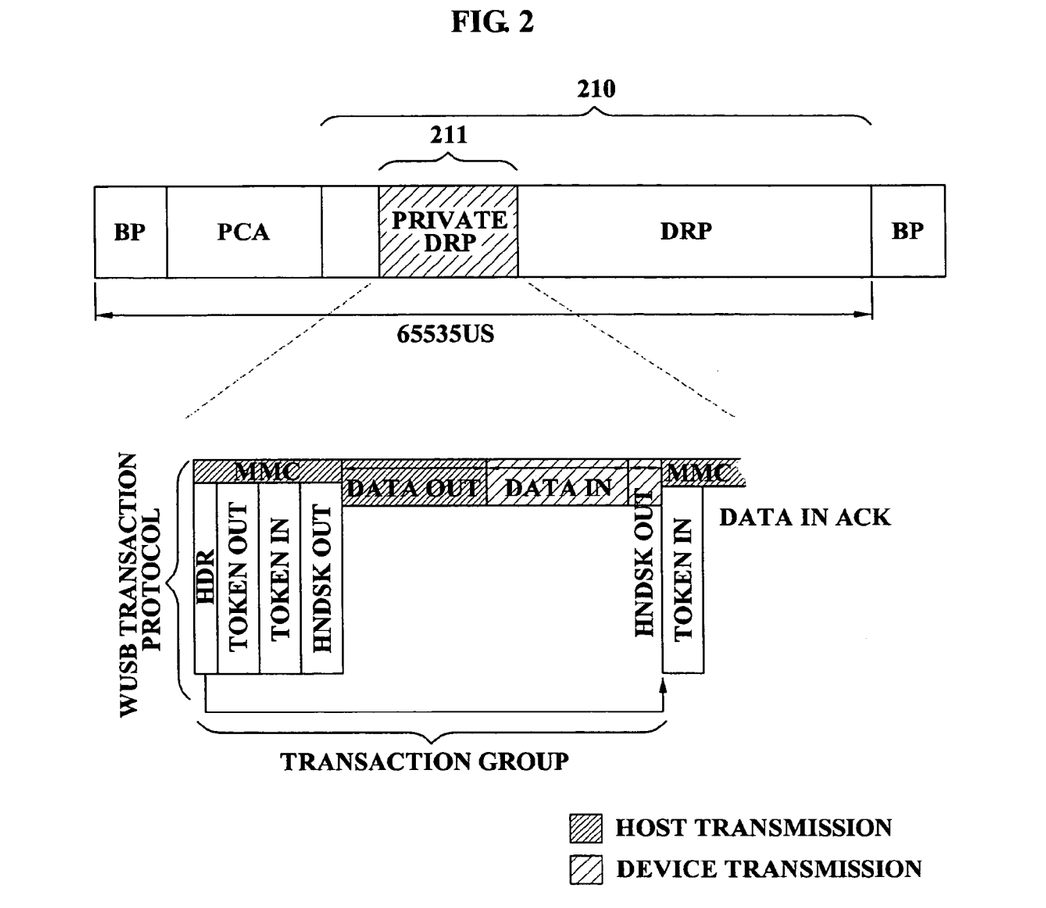
FIG. 2 is a diagram illustrating a multiband orthogonal frequency division multiplexing alliance (MBOA) medium access control (MAC) channel time and a WUSB packet format.

FIG. 2 is a diagram illustrating a multiband orthogonal frequency division multiplexing alliance (MBOA) medium access control (MAC) channel time and a WUSB packet format.

Referring to FIG. 2, one MBOA MAC channel time includes a beacon period (BP), a prioritized channel access (PCA), and a distributed reservation protocol (DRP) 210.

In this instance, actually transmitting and receiving data between a wireless universal serial bus host (WUSB host) and a WUSB device is performed in a private DRP 211 which is assigned to the DRP 210.

Namely, the private DRP 211 is assigned to every WUSB cluster. Also, all the WUSB clusters have a unique private DRP 211.

As an example, devices in a first WUSB cluster communicate with each other by transmitting data to and receiving data from a first private DRP. Devices in a second WUSB cluster communicate with each other by transmitting data to and receiving data from a second private DRP.

Transmitting and receiving data in the private DRP 211 is performed according to a same format as illustrated in FIG. 2.

The MBOA MAC channel time and the WUSB packet format illustrated in FIG. 2 is described in detail in a WUSB specification.

Figure 3:
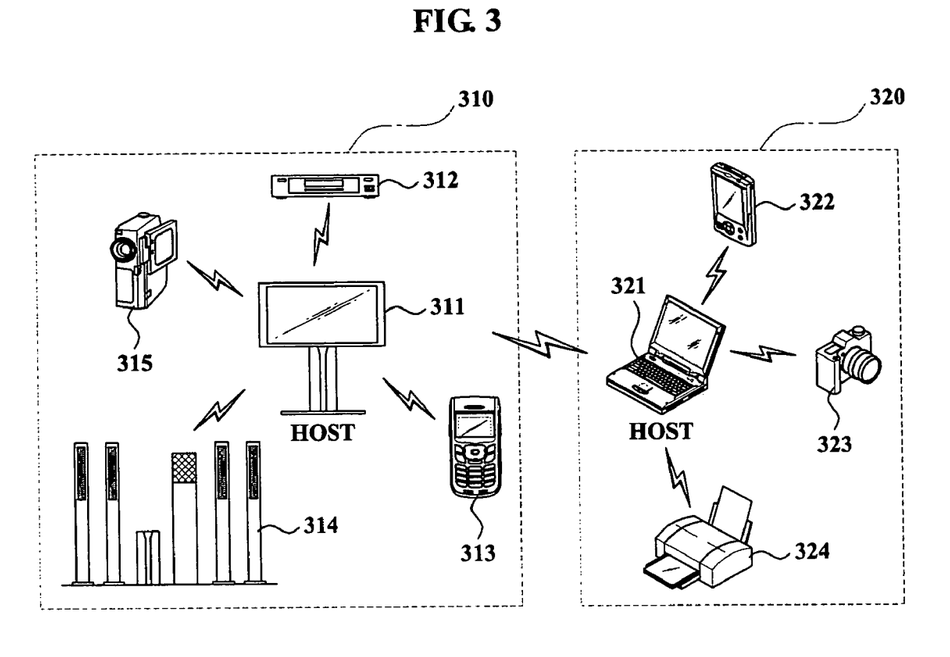
FIG. 3 is a diagram illustrating two WUSB clusters according to an exemplary embodiment of the present invention.

FIG. 3 is a diagram illustrating two WUSB clusters according to an exemplary embodiment of the present invention;

Referring to FIG. 3, a digital television (DTV) 311 operates as a WUSB host in a WUSB cluster 310. Also, a set-top box 312, a mobile phone 313, a home theater 314, and a camcorder 315 each operate as a WUSB device in the WUSB cluster 310.

Also, a notebook computer 321 operates as a WUSB host in another WUSB cluster 320. Also, a portable multimedia player (PMP) 322, a digital camera 323, and a printer 324 each operate as a WUSB device in the WUSB cluster 320.

Unlike a conventional WUSB host, the WUSB host according to an exemplary embodiment of the present invention may receive operation state information of neighboring WUSB apparatuses.

As an example, while operating as the host in the WUSB cluster 320, the notebook computer 321 operate as a device in the WUSB cluster 310 at the same time. Accordingly, the notebook computer 321 may need to communicate with the DTV 311. In this instance, the notebook computer 321 receives operation state information from WUSB apparatuses 311, 312, 313, 314, 315 which are included in the WUSB cluster 310. Also, the notebook computer 321 may determine which of the WUSB apparatuses is the host of the cluster and which of the WUSB apparatuses is a device of the WUSB cluster 310 based on the received operation state information.

Figure 4:
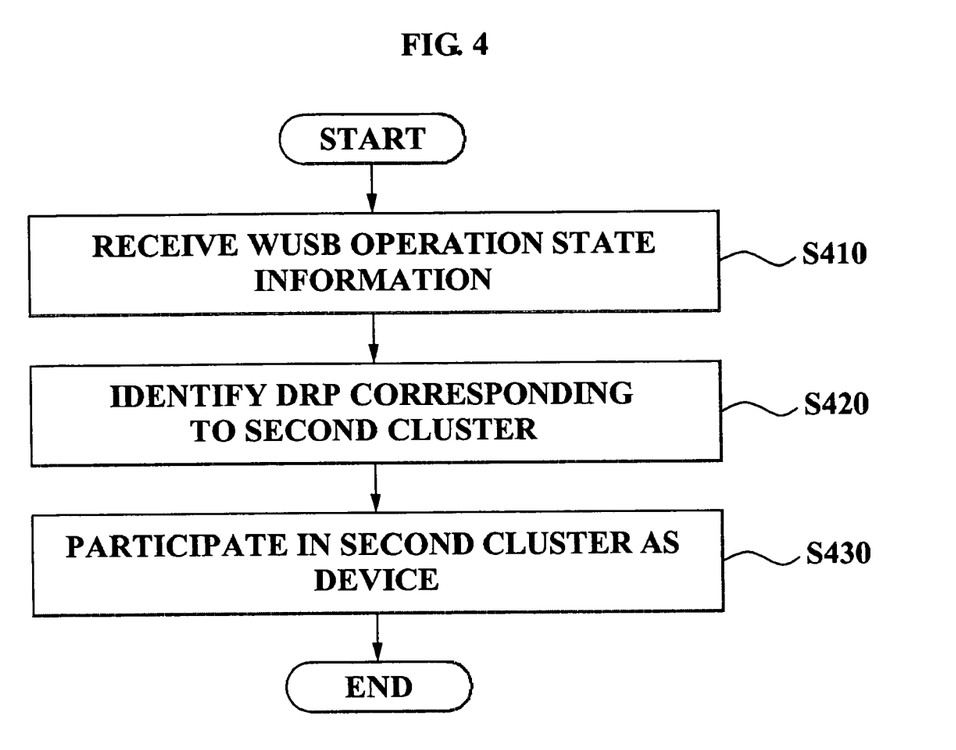
FIG. 4 is a flowchart illustrating a method of operating a WUSB cluster according to an exemplary embodiment of the present invention.

FIG. 4 is a flowchart illustrating a method of operating a WUSB cluster according to an exemplary embodiment of the present invention.

Referring to FIG. 4, in operation S410, operation state information is received from a neighboring wireless USB apparatus in a BP.

Operation state information may be information indicating a corresponding apparatus is a wireless USB apparatus. For example, the operation state information of the wireless USB apparatus may include at least any one of information indicating that the corresponding apparatus is a WUSB host, information indicating that the apparatus is a WUSB device, and information indicating that the apparatus is a WUSB dual role device. In this instance, the dual role indicates that the WUSB apparatus operates as a WUSB host while operating as a WUSB device according to an exemplary embodiment of the present invention.

In this instance, the operation state information may be received using a DRP control field of a distributed reservation protocol information element (DRP IE) in the BP. In this instance, the operation state information may be received using a reserved area of the DRP control field.

Also, in operation S420, according to the method of operating the WUSB apparatus according to an exemplary embodiment of the present invention, the wireless USB apparatus which is operating as a host in a first cluster, according to the operation state information, identifies a DRP of to a second cluster.

According to exemplary embodiments, operation S420 may include recognizing the wireless USB apparatus which operates as a host in the second cluster by using the operation state information, and identifying the DRP corresponding to the wireless USB apparatus which operates as the host in the second cluster.

Namely, the wireless USB apparatus which is operating as the host in the first cluster may identify the host and devices in a neighboring second cluster by using the operation state information. Also, the wireless USB apparatus which is operating as the host in the first cluster may identify the DRP which is assigned to the host and the devices in the second cluster, and with which the host and the devices in the second cluster communicate with each other. Accordingly, the wireless USB apparatus which is operating as the host in the first cluster may operate as a device in the second cluster.

Also, in operation S430, according to the method of operating the wireless universal serial bus (WUSB) apparatus according to an exemplary embodiment of the present invention, the wireless USB apparatus which is operating as the host in the first cluster participates in the second cluster as a device by transmitting and receiving data in the DRP corresponding to the second cluster.

Figure 5:
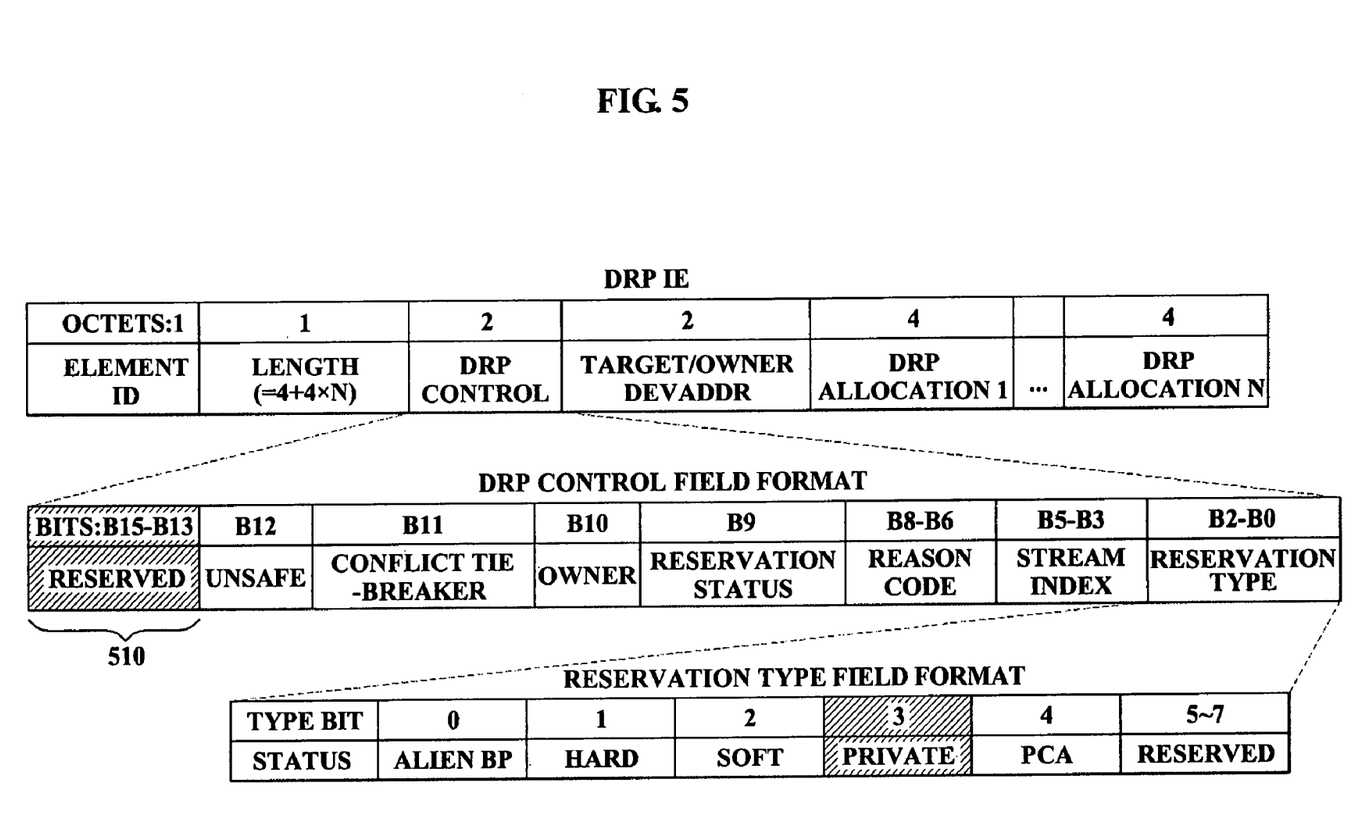
FIG. 5 is a diagram illustrating a distributed reservation protocol information element (DRP IE) format.

FIG. 5 is a diagram illustrating a DRP IE format.

Referring to FIG. 5, top three bits 510 of a DRP control field of the DRP IE are included in a reserved area. Accordingly, a method of operating the wireless universal serial bus (WUSB) apparatus according to an exemplary embodiment of the present invention may transmit operation state information by using at least a portion of the upper three bits 510 of the DRP control field.

The DRP IE illustrated in FIG. 5 may be transmitted by a WUSB host in a BP.

As illustrated in FIG. 5, information about an assigned DRP is included in the DRP IE. Accordingly, when the DRP IE including the operation state information is transmitted, the WUSB apparatus receiving the DRP IE may find out whether the apparatus transmitting the DRP IE is the WUSB apparatus, and the DRP that a corresponding apparatus uses.

Figure 6:
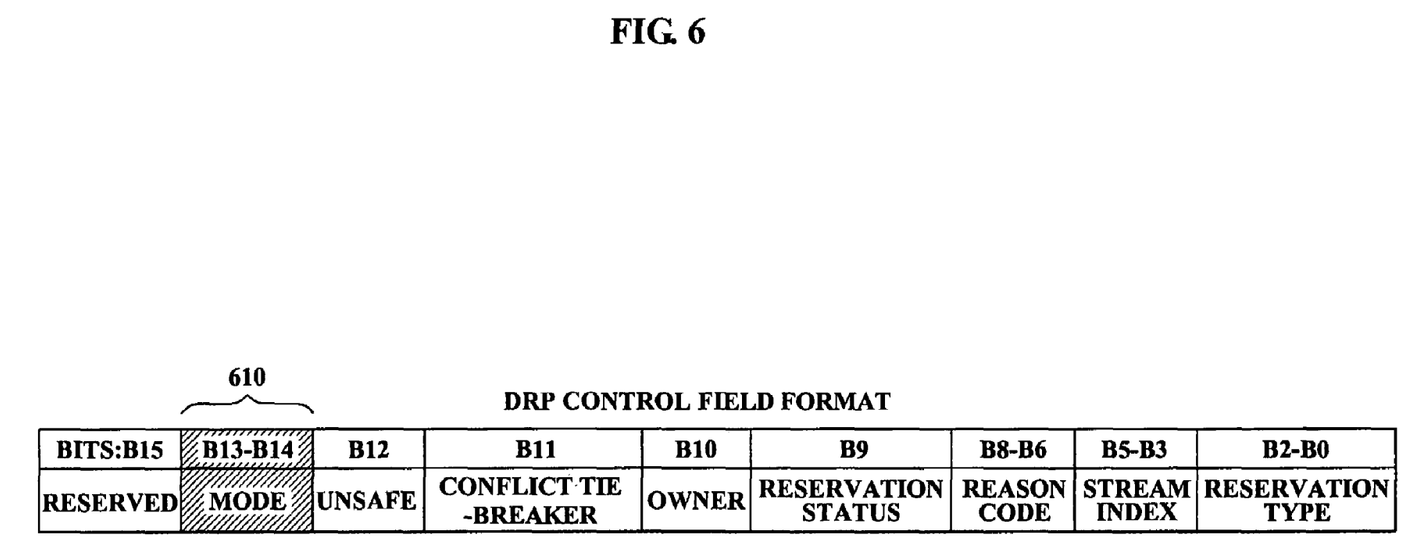
FIG. 6 is a diagram illustrating a format of a distributed reservation protocol (DRP) control field according to an exemplary embodiment of the present invention.

FIG. 6 is a diagram illustrating a format of a DRP control field according to an exemplary embodiment of the present invention.

Referring to FIG. 6, the DRP control field according to an exemplary embodiment of the present invention uses a second highest bit and a third highest bit, i.e. b13-b14 610 as operation state information bits. Namely, the operation state information according to an exemplary embodiment of the present invention may identify one of a wireless USB host (WUSB host), a wireless USB device (WUSB device), and a wireless USB dual role (WUSB dual role) device. Accordingly, the operation state information needs at least two bits. Also, the operation state information may identify one of the WUSB host, the WUSB device, and the WUSB dual role device by using two bits which are the second highest bit and the third highest bit 610 of the DRP control field.

Figure 7:
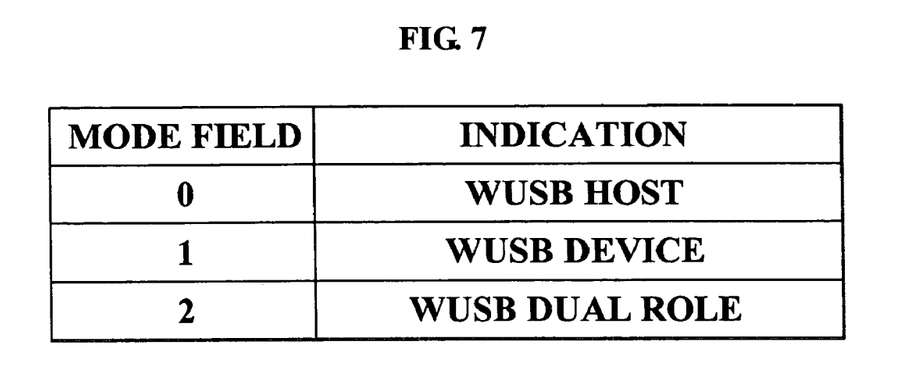
FIG. 7 is a diagram illustrating a bit configuration of operation state information according to an exemplary embodiment of the present invention.

FIG. 7 is a diagram illustrating a bit configuration of operation state information according to an exemplary embodiment of the present invention.

Referring to FIG. 7, the operation state information according to an exemplary embodiment of the present invention indicates a WUSB host when a mode field is '0'. Also, the operation state information according to an exemplary embodiment of the present invention indicates a WUSB device when a mode field is '1'. Also, the operation state information according to an exemplary embodiment of the present invention indicates a WUSB dual role device when a mode field is '2'. In this instance, '0', '1', and '2' may correspond to operation state information bits '00', '01', and '10'. The above values are examples only, and the present invention is not limited to these values.

The method of operating a wireless universal serial bus (USB) device according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Figure 8:
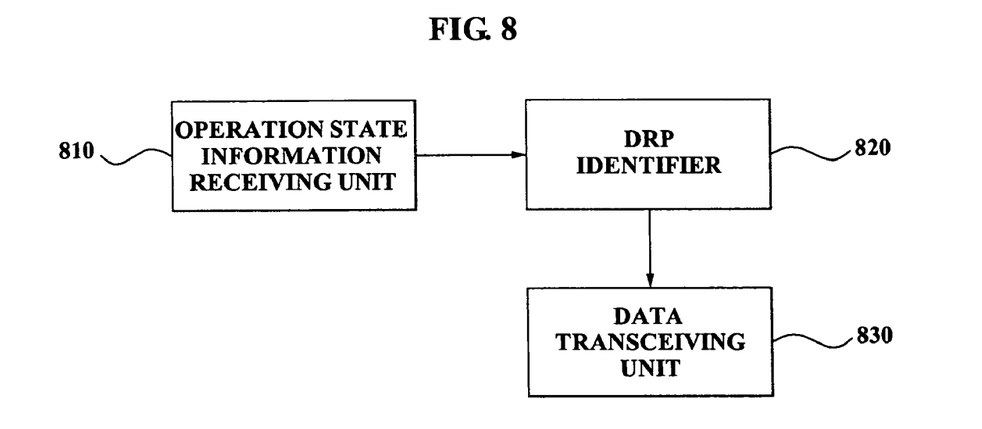
FIG. 8 is a block diagram of a wireless USB apparatus according to an exemplary embodiment of the present invention.

FIG. 8 is a block diagram of a WUSB apparatus according to an exemplary embodiment of the present invention.

Referring to FIG. 8, the wireless USB apparatus according to an exemplary embodiment of the present invention includes an operation state information receiving unit 810, a DRP identifier 820, and a data transceiving unit 830.

The operation state information receiving unit 810 receives operation state information from a neighboring wireless USB apparatus in a BP.

The DRP identifier 820 identifier identifies a DRP corresponding to another cluster by using the operation state information while the wireless USB apparatus operates as a WUSB host.

The data transceiving unit 830 transmits and receives data with the DRP corresponding to the other cluster in order to participate in the other cluster as a device.

In this instance, the DRP identifier may recognize the wireless USB apparatus which operates as a host in the other cluster by using the operation state information, and identify the DRP corresponding to the wireless USB apparatus which operates as a host in the other cluster. As illustrated in FIG. 5, when the operation state information is transmitted via predetermined bits of a DRP IE, the wireless USB apparatus may find out an operation state of the wireless USB apparatus as well as the DRP that a corresponding wireless USB apparatus uses.

Figure 9:
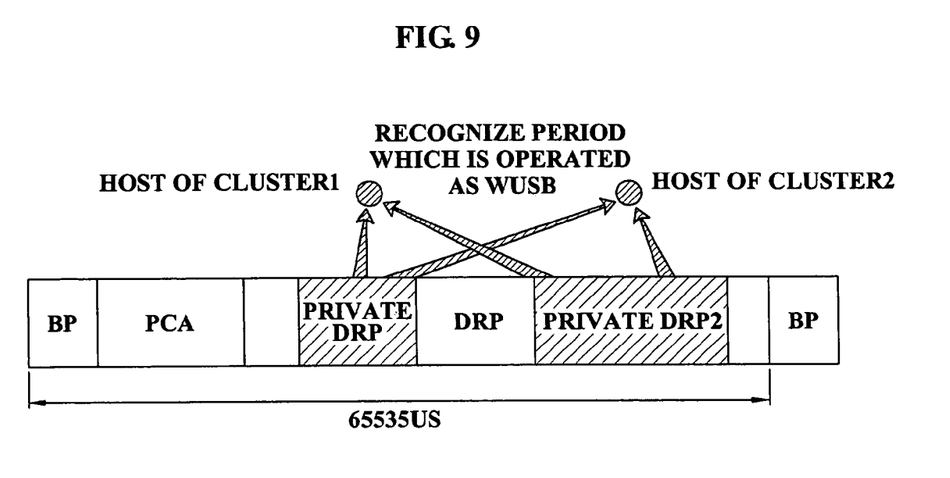
FIG. 9 is a diagram illustrating a WUSB channel time according to an exemplary embodiment of the present invention.

FIG. 9 is a diagram illustrating a WUSB channel time according to an exemplary embodiment of the present invention.

Referring to FIG. 9, a first cluster transmits and receives data by using a first DRP, i.e. private DRP. Also, a second cluster transmits and receives data by using a second DRP, i.e. private DRP 2.

In this instance, a wireless USB apparatus according to the present invention may find out operation state information of the wireless USB apparatuses in another WUSB cluster, and the DRP corresponding to a corresponding USB apparatus. Accordingly, while maintaining the first cluster, a host of the first cluster may operate as a device of the second cluster with the second DRP, i.e. private DRP 2, at the same time.

Also, the wireless USB apparatus according to the present invention, while maintaining the second cluster, can operate as the host of the second cluster and as a device of the first cluster with the first DRP, i.e. private DRP 1, at the same time.

Figure 10:
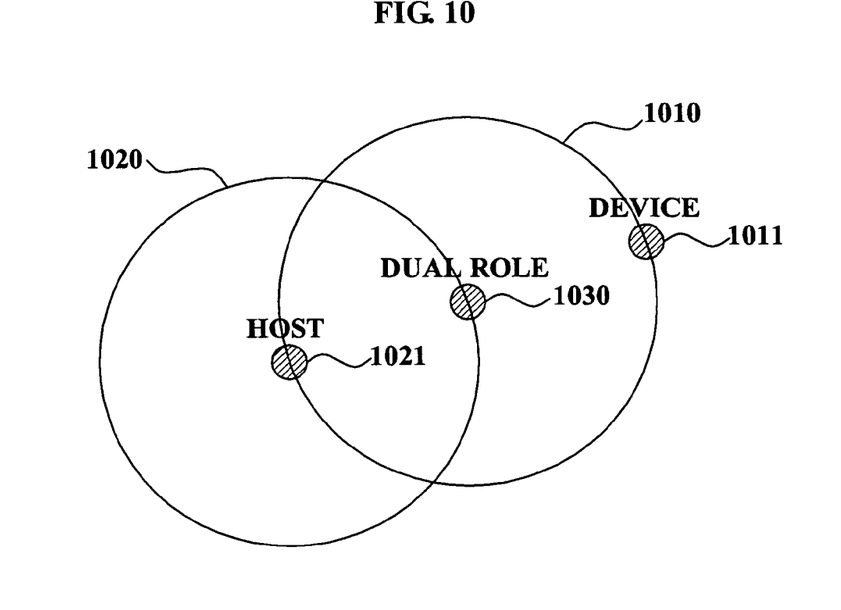
FIG. 10 is a diagram illustrating WUSB clusters according to an exemplary embodiment of the present invention.

FIG. 10 is a diagram illustrating WUSB clusters according to an exemplary embodiment of the present invention.

Referring to FIG. 10, a wireless USB apparatus 1030 operates as a host, and a wireless USB apparatus 1011 operates as a device in a first cluster 1010.

A wireless USB apparatus 1021 operates as the host in a second cluster 1020.

The wireless USB apparatus 1030 which is the host of the first cluster 1010 receives operation state information of the wireless USB apparatus 1021. Accordingly, the wireless USB apparatus 1030 may find out that an operation state of the wireless USB apparatus 1021 is as a host, and the wireless USB apparatus 1021 uses a predetermined DRP.

Accordingly, while communicating with the wireless USB apparatus 1011 as the host of the first cluster 1010, the wireless USB apparatus 1030 may communicate with the wireless USB apparatus 1021 as a device of the second cluster 1020.

Namely, the present invention enables a multi-hop data transmission, i.e. a transmission from the wireless USB apparatus 1011 to the wireless USB apparatus 1021 via the wireless USB apparatus 1030.

According to the present invention, a wireless USB device which operates as a host may effectively join another neighboring wireless universal serial bus (WUSB) cluster as a device.

According to the present invention, a wireless USB apparatus which operates as a host may effectively obtain information of the wireless USB apparatuses which belong to a neighboring WUSB cluster.

According to the present invention, a predetermined wireless USB apparatus may obtain information about which WUSB apparatus from a plurality of wireless USB apparatuses belonging to a neighboring WUSB cluster operates as a host, and which wireless USB apparatus from a plurality of WUSB apparatuses belonging to the neighboring WUSB cluster operates as a device.

According to the present invention, a wireless USB apparatus enables a multi-hop data transmission by operating as a device in another WUSB cluster.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of operating a first wireless universal serial bus (USB) apparatus, the method comprising:
   receiving operation state information from a second neighboring wireless USB apparatus in a beacon period (BP);
   identifying, by the first wireless USB apparatus which is operating as a host in a first cluster by using the operation state information, a distributed reservation protocol (DRP) corresponding to a second cluster; and
   participating, by the first wireless USB apparatus which is operating as the host in the first cluster, in the second cluster as a device by transmitting and receiving data in the DRP corresponding to the second cluster.

2. The method of claim 1, wherein the identifying of the DRP comprises:
   recognizing the second wireless USB apparatus, which operates as the host in the second cluster, by using the operation state information; and
   identifying the DRP corresponding to the second wireless USB apparatus which operates as the host in the second cluster.

3. The method of claim 1, wherein the operation state information of the second wireless USB apparatus is received using bits of a distributed reservation protocol information element (DRP IE).

4. The method of claim 3, wherein the bits are predetermined bits of a DRP control field of the DRP IE.

5. The method of claim 4, wherein the operation state information of the second wireless USB apparatus indicates one of a wireless USB host (WUSB host), a wireless USB device (WUSB device), and a wireless USB dual role (WUSB dual role) device.

6. The method of claim 5, wherein the predetermined bits of the DRP control field include three bits within a reserved area of the DRP control field.

7. A computer-readable recording medium storing a program for implementing a method of operating a first wireless USB apparatus, the method comprising:
   receiving operation state information from a second wireless USB apparatus in a beacon period (BP);
   identifying, by the first wireless USB apparatus which is operating as a host in a first cluster by using the operation state information, a distributed reservation protocol (DRP) corresponding to a second cluster; and
   participating, by the first wireless USB apparatus which is operating as the host in the first cluster, in the second cluster as a device by transmitting and receiving data in the DRP corresponding to the second cluster.

8. A first wireless USB apparatus comprising:
   an operation state information receiving unit which receives operation state information from a second wireless USB apparatus in a beacon period (BP);
   a distributed reservation protocol (DRP) identifier which identifies the DRP corresponding to another cluster by using the operation state information while operating as a wireless USB host; and
   a data transceiving unit which transmits and receives data in the DRP corresponding to the other cluster in order to participate in the other cluster as a device.

9. The first wireless USB apparatus of claim 8, wherein the DRP identifier recognizes a third wireless USB apparatus which operates as a host in the other cluster by using the operation state information, and identifies the DRP corresponding to the third wireless USB apparatus which operates as a host in the other cluster.

10. The first wireless USB apparatus of claim 8, wherein the operation state information of the second wireless USB apparatus is received using bits of a DRP information element (IE).

11. The first wireless USB apparatus of claim 10, wherein said bits are predetermined bits of a DRP control field of the DRP IE.

12. The wireless USB apparatus of claim 10, wherein the operation state information of the second wireless USB apparatus indicates one of a wireless USB host (WUSB host), a wireless USB device (WUSB device), and a wireless USB dual role (WUSB dual role) device.

13. The wireless USB apparatus of claim 11, wherein the predetermined bits of the DRP control field include three bits within a reserved area of the DRP control field.

* * * * *